April 1, 1924.
J. C. BOHMKER
1,488,661
SPREADER
Filed Nov. 15, 1922  2 Sheets-Sheet 1
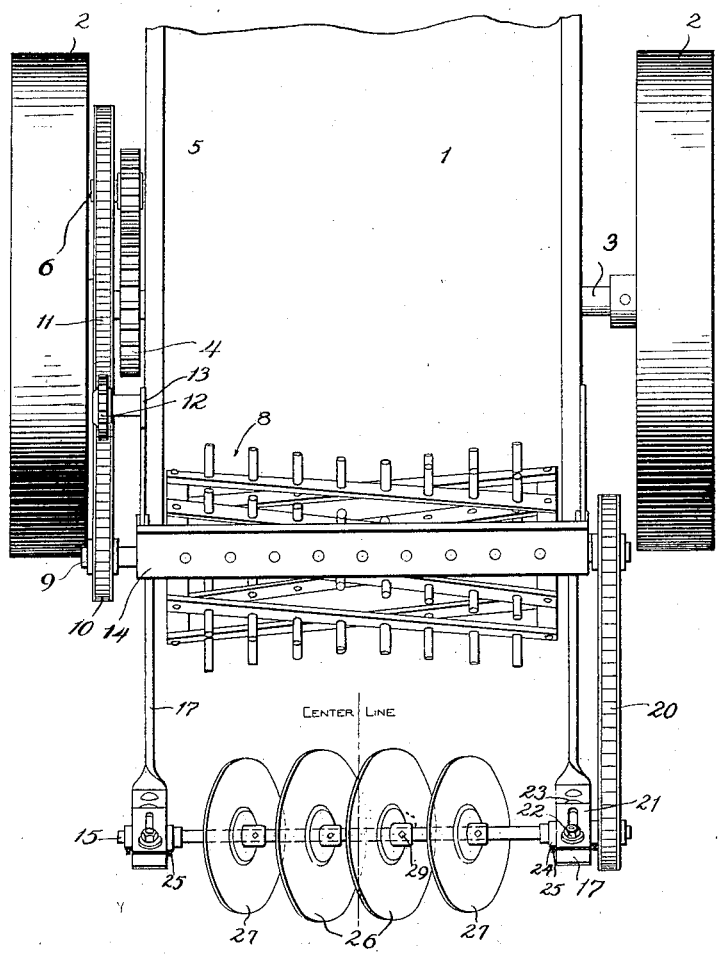
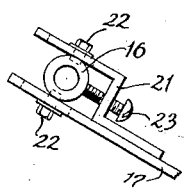
INVENTOR
JOHN C. BOHMKER April 1, 1924.
J. C. BOHMKER
SPREADER
Filed Nov. 15, 1922  2 Sheets-Sheet 2
1,488,661
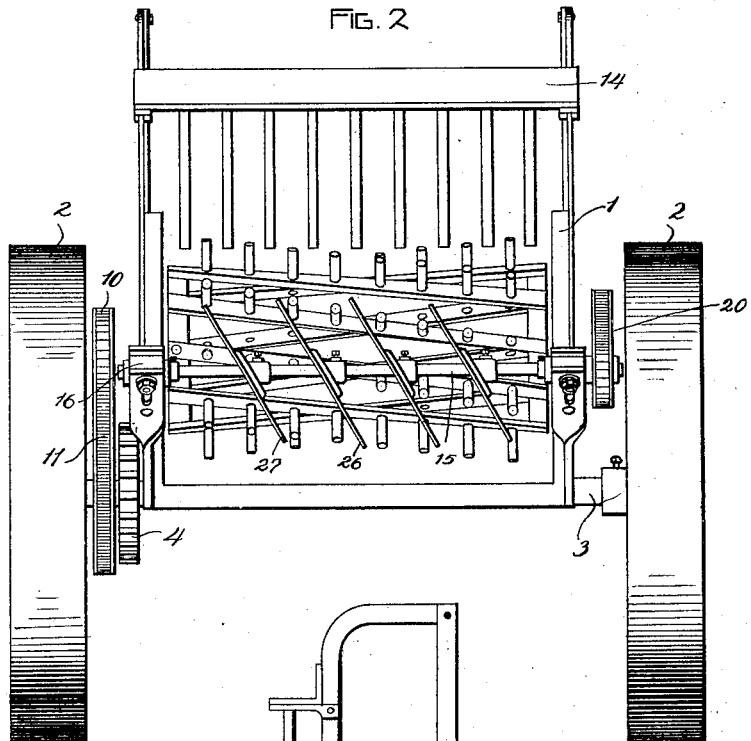
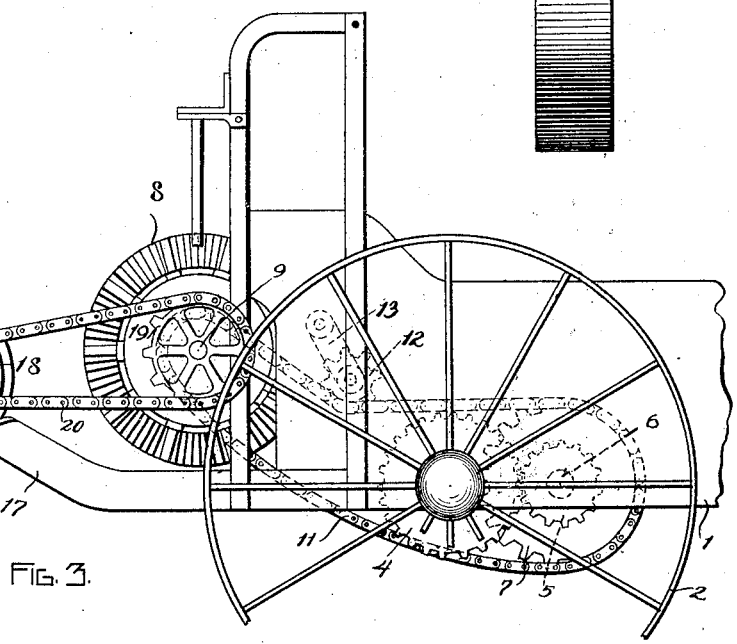
INVENTOR
JOHN C. BOHMKER
ATTYS.

Patented Apr. 1, 1924.

1,488,661

UNITED STATES PATENT OFFICE.

JOHN C. BOHMKER, OF BRADLEY, ILLINOIS, ASSIGNOR TO SEARS, ROEBUCK AND CO., OF CHICAGO, ILLINOIS, A CORPORATION OF NEW YORK.

SPREADER.

Application filed November 15, 1922. Serial No. 601,059.

*To all whom it may concern:*

Be it known that I, JOHN C. BOHMKER, a citizen of the United States, residing at Bradley, in the county of Kankakee and State of Illinois, have invented a certain new and useful Spreader, of which the following is a specification.

The invention relates to machines for spreading manure or other fertilizing material and more particularly to machines adapted to distribute the fertilizer evenly over a strip of substantial width.

The primary object of the invention is to provide a device of simple, durable and inexpensive construction for attachment at the distributing end of the spreader to receive the material delivered from the spreader and to further disintegrate such material and to deliver the same uniformly over a relatively wide strip.

Manure spreaders as ordinarily constructed are provided with a relatively narrow wagon bed or box which, when loaded in the most convenient and efficient manner, usually results in a "crowned" load closely packed along its center and loosely packed along its edges. The nature of the material makes its uniform distribution by a mechanical device a difficult matter, and another object is to provide a device that distributes the fertilizer evenly over a strip of predetermined width regardless of whether the load is "crowned" or is unevenly packed.

Manure spreaders now in general use are ordinarily provided with an apron for moving the load rearwardly in the wagon body into engagement with a toothed cylinder which partially disintegrates the material while discharging it rearwardly, and a further object is the provision of an attachment adapted to be mounted on any manure spreader of this general type and which is capable of receiving the partially disintegrated material and further disintegrating the same while distributing it in a lateral and rearward direction.

Another object is to provide a distributing device of simple and economical construction which can be easily dismounted.

Further objects and advantages will be apparent in the following description of a preferred embodiment of my invention, which is illustrated in the accompanying drawings.

Figure 1 of the drawings represents in plan view the rear portion of a manure spreader including the discharging apparatus and its driving means, and my device mounted in connection therewith. Fig. 2 is a rear end view of the same mechanism. Fig. 3 is a side elevation. Fig. 4 is a detail view showing an adjustable bearing for the distributor shaft.

The body of the manure spreader is indicated by the numeral 1 and may be equipped with any one of the well known devices (not illustrated herein) adapted to move the load bodily to the rear for discharge. Rear wheels 2 are suitably mounted on a driving axle 3 which is journalled upon the body 1. A spur gear 4 carried upon the driving axle engages a pinion 5 mounted upon a stub axle 6 supported by the body 1. A sprocket wheel 7 is also mounted on the axle 6 and is fixed relative to the pinion 5. A beater cylinder 8 for discharging the load is rotatably supported at the rear end of the body and is provided with a shaft 9 carrying a sprocket 10 at one ed. Rotation of the cylinder 8 is accomplished by connecting the sprocket 7 with the sprocket 10 by means of a drive chain 11. An idler sprocket 12 mounted upon a swinging bracket 13 attached to the body 1 is adapted to adjust the tension in the drive chain 11. A rake 14 positioned above the cylinder 8 is suitably supported upon the body 1. A more minute description of the foregoing discharging devices is not considered necessary since they are well known in the art.

The widespread distributing mechanism indicated in its entirety at A is mounted upon a shaft 15. The device is positioned with shaft 15 to the rear and preferably a short distance below the shaft 9 of the beater cylinder. The material is discharged from the cylinder with an initial rearward velocity such that it falls in a rearward and downward direction upon the distributing device. The shaft 15 is journalled in bearings 16 which are mounted upon a pair of supporting brackets 17 suitably attached to the body 1. Rotation of the shaft 15 is accomplished by connecting it with the shaft 9 of the beater cylinder, the connection comprising a sprocket 18 rigidly mounted on the shaft 15 and a sprocket 19 mounted on the shaft 9, and a driving chain 20 associated with the sprockets. The shaft 15 is caused to revolve more rapidly than the beater cylinder by making the sprocket 18 of proportionately smaller diameter than the sprocket 19. Provision is made for adjusting the tension of the driving chain 20 by having the bearings 16 adjustably fastened to the brackets 17. For this purpose an approximately Z-shaped bar 21 is mounted on the outer end of each of the brackets 17 with the bearing 16 positioned therein as best shown in Fig. 4. The bar 21 and the bracket 17 are correspondingly slotted to receive a bolt 22 by means of which the bearing 16 is adjustably clamped in position. Adjustment of the bearings 16 and the shaft 15 relative to the beater cylinder is accomplished by turning a screw bolt 23 after loosening bolts 22. Lateral movement of the shaft 15 is prevented by mounting a collar 24 on each end to abut bearing 16, the collar being adjustably fastened as by a stud bolt 25. Removal of the attachment bodily from the spreader is quickly and easily accomplished by loosening bolts 22, the bolt 23 first having been withdrawn sufficiently to permit removal of drive chain 20.

In the embodiment of the widespread attachment illustrated in the drawings a plurality of disks are shown fixedly mounted on shaft 15 in equidistantly spaced parallel relation. I have found by experience that most satisfactory results are obtained in securing disintegration and uniform distribution of the discharged material by arranging the disks as shown, with the inner disks 26 overlapping at the middle of the device and with each of the outer disks 27 positioned so that the plane perpendicular to the axis of shaft 15 which touches the extreme inner section of disk 27 also is contiguous to the extreme outer section of the adjacent disk 26. Equal spacing of all the disks and at the same time overlapping of the inner disks is obtained by making the diameters of the inner disks proportionately greater than the diameter of the outer. The disks may be constructed with any ratio of diameters and angularity of mounting on the shaft which the type of spreader and desired width of strip to be covered may require. Herein they are shown rigidly fastened on the shaft 15 by stud bolts 29 which permit their easy removal for replacement, sharpening or the like. The device presents no angular edges that tend to accumulate binder twine or the like as is the case with distributors equipped with blades. Furthermore, the parts of the device being of light and simple construction can be cheaply manufactured and require relatively little power for operation whereby wear on the operating mechanism is minimized.

In operation the material is discharged rearwardly from the beater cylinder into the rapidly revolving disks of the distributor. The cylinder and disks each revolve in anti-clockwise direction as observed in Fig. 3. In Fig. 1 the distributor is shown with the left hand portion of each disk above the shaft 15, from which position it revolves and discharges its load to the rear and laterally to the right. Rotation of the distributor through 180° from the position shown brings the opposite sides of the disks above the shaft in a position to receive the material and discharge it to the rear and laterally to the left. It is obvious that as one side of each of the disks is being loaded for discharge in one lateral direction the opposite side is being discharged by centrifugal force in the opposite direction. This cycle of operations occurs once for each revolution of the distributor thereby causing each disk alternately to discharge laterally to the right and to the left. Since the middle disks overlap material is discharged from the center of the load once laterally to the right and once laterally to the left for each revolution of the distributor, thereby providing capacity for distributing the additional material comprising the crowned portion of the load. The adjacent relatively light side portions of the load are discharged only once for each revolution of the distributor. It is obvious that this provision for discharging from the middle of the load twice as often as from the adjacent side portions tends to a uniform distribution of a crowned load over a relatively wide strip. By increasing the diameter of the two intermediate disks the necessary increased capacity of discharge from the crowned portion is provided as well as a relatively high velocity of discharge which carries the material farther and more completely disintegrates it.

I claim as my invention:

1. In combination with a spreader mechanism having a body, of a distributor mounted at the rear end of the body so as to receive material discharged rearwardly therefrom, said distributor comprising a plurality of disks mounted obliquely on a common axis and arranged in substantially parallel relation, there being two intermediate disks of large distributing capacity adapted to handle the material discharged from the center line of the load, and other disks on opposite sides of the two intermediate disks and of relatively smaller distributing capacity adapted to handle the material discharged from the sides of the load.

2. In combination with a spreader mechanism having a body, of a distributor mounted at the rear end of the body so as to receive material discharged rearwardly therefrom, said distributor comprising a plurality of disks mounted obliquely on a common axis and arranged in substantially parallel relation, there being two intermediate disks of large distributing capacity adapted to handle the material discharged from the center line of the load, and side disks on opposite sides of the two intermediate disks and of relatively smaller distributing capacity adapted to handle the material discharged from the load upon opposite sides of the center line of the body, the intermediate disks being of greater diameter than the side disks.

3. In combination with a spreader mechanism having a body, of a distributor mounted at the rear end of the body so as to receive material discharged rearwardly therefrom, said distributor comprising a plurality of disks mounted obliquely on a common axis and arranged in substantially parallel relation, there being two intermediate disks of large distributing capacity adapted to handle the material discharged from the center line of the load, and side disks on opposite sides of the two intermediate disks and of relatively smaller distributing capacity adapted to handle the material discharged from the sides of the load, the intermediate disks being spaced apart but in overlapping relation.

4. In combination with a spreader mechanism having a body, of a distributor mounted at the rear end of the body so as to receive material discharged rearwardly therefrom, said distributor comprising a plurality of disks mounted obliquely on a common axis and arranged in substantially parallel relation there being two intermediate disks of large distributing capacity adapted to handle the material discharged from the center line of the load, and other disks on opposite sides of the two intermediate disks of relatively smaller distributing capacity adapted to handle the material discharged from the sides of the load, the two intermediate disks being of greater diameter than the side disks and arranged in overlapping relation.

In testimony whereof, I have hereunto affixed my signature.

JOHN C. BOHMKER.